(12) United States Patent
Verma et al.

(10) Patent No.: US 8,631,215 B1
(45) Date of Patent: Jan. 14, 2014

(54) PROVISIONING DIFFERENT TYPES OF WRITE ONCE, READ MANY STATES

(75) Inventors: Pavan Verma, Bangalore (IN); Anuja Jaiswal, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 607 days.

(21) Appl. No.: 12/749,133

(22) Filed: Mar. 29, 2010

(51) Int. Cl.
*G06F 12/00* (2006.01)

(52) U.S. Cl.
USPC ............... 711/156; 711/111; 711/E12.001

(58) Field of Classification Search
USPC .......... 711/103, 111, E12.001, 166, 163, 164, 711/165, 154, 156, 112, 159
See application file for complete search history.

(56) References Cited

U.S. PATENT DOCUMENTS

| | | | |
|---|---|---|---|
| 7,155,460 B2 * | 12/2006 | McGovern et al. ........ 707/999.2 |
| 7,480,779 B2 * | 1/2009 | Tsuji ............................. 711/162 |
| 7,930,493 B1 * | 4/2011 | McGovern et al. ........... 711/159 |
| 8,332,362 B2 * | 12/2012 | McGovern et al. ........... 711/166 |
| 8,516,022 B1 * | 8/2013 | Kanteti et al. ................ 707/827 |
| 2006/0123232 A1 * | 6/2006 | Cannon et al. ................ 713/165 |
| 2007/0118687 A1 * | 5/2007 | McGovern et al. ........... 711/112 |
| 2009/0125572 A1 * | 5/2009 | Cannon et al. ................ 707/205 |
| 2010/0281230 A1 * | 11/2010 | Rabii et al. .................... 711/165 |
| 2011/0107024 A1 * | 5/2011 | Bish et al. ..................... 711/111 |

* cited by examiner

*Primary Examiner* — Pierre-Michel Bataille
(74) *Attorney, Agent, or Firm* — Mahamedi Paradice Kreisman LLP

(57) ABSTRACT

Example embodiments provide various techniques for provisioning a write once, read many (WORM) state. In one embodiment, an identifier is accessed. This identifier is assigned to a volume that is associated with an aggregate of storage devices and identifies a first type of the WORM state that is different from a second type of the WORM state associated with the aggregate. The first type of the WORM state is applied to the volume and the application results in different types of WORM states between the aggregate and the volume. Modification of data stored in the volume is then restricted based the first type of WORM state.

20 Claims, 8 Drawing Sheets

PROVISIONING DIFFERENT TYPES OF WRITE ONCE, READ MANY STATES

FIELD

The present disclosure relates generally to storage systems. In an example embodiment, the disclosure relates to the provisioning of different types of write once, read many states.

BACKGROUND

Write once, read many (WORM) storage is a data storage technology that allows data to be written to storage media a single time and not rewritten thereafter to prevent tampering of the stored data. WORM storage traditionally used optical media, but recent innovations have applied WORM storage to other storage technologies, such as tape storage and hard disk drives. WORM storage has been used for archiving data that requires a long retention period (e.g., medical information), but driven by the recent growth of legislation in many countries, WORM storage is now increasingly being used to archive corporate data, such as financial documents and emails.

It should be appreciated there are a variety of different implementations of WORM storage, and many WORM storages require the creation of separate aggregates of storage devices for all the different implementations. For example, if three different types of WORM storage implementations are needed, then three different aggregates need to be created. The requirement of separate aggregates for each different type of implementation may result in the inefficient utilization of storage devices. For example, the creation of each aggregate creates a certain Redundant Arrays of Independent Disks (RAID) overhead. Additionally, a minimum of three storage devices are required to create an aggregate in some RAID implementations, such as Double Parity RAID 6, and a typical storage system may not have this number of free storage devices available. Furthermore, a large number of aggregates may not have adequate capacity utilization.

SUMMARY

Embodiments of the present invention provide various techniques for provisioning different types of write once, read many (WORM) states. In general, different types of WORM states can be provisioned within an aggregate of storage devices. In particular, different volumes included in an aggregate can be provisioned with different types of WORM states. As a result, an aggregate can have a particular type of WORM state while its volume can have a different type of WORM state. Therefore, the type of WORM state of an aggregate is decoupled from the type of WORM state of its volume.

The types of WORM states between a volume and an aggregate can be decoupled by using a particular identifier assigned to a volume. This identifier identifies the type of WORM state of the volume. A separate identifier is used to identify a type of WORM state of an aggregate. The "volume" identifier may identify a type of WORM state that is different from a type of WORM state assigned to an aggregate. The type of WORM state identified by the "volume" identifier is applied to the volume and as a result, the modification of data stored in the volume is restricted based on this type of WORM state.

In addition to decoupling the types of WORM states between an aggregate and its volumes, the volumes themselves may also have different WORM states between each other. As a result, different types of WORM states do not need the creation of separate aggregates for each different type of WORM state. Instead, the different types of WORM states may be created, for example, in different volumes of a single aggregate. The ability to create different types of WORM states within a single aggregate may possibly result in the efficient utilization of storage devices. Additionally, the use of identifiers may possibly simplify the changing of one type of WORM state of a volume or aggregate to a different type by simply changing the existing identifier to a different identifier that identifies a different type of WORM state.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
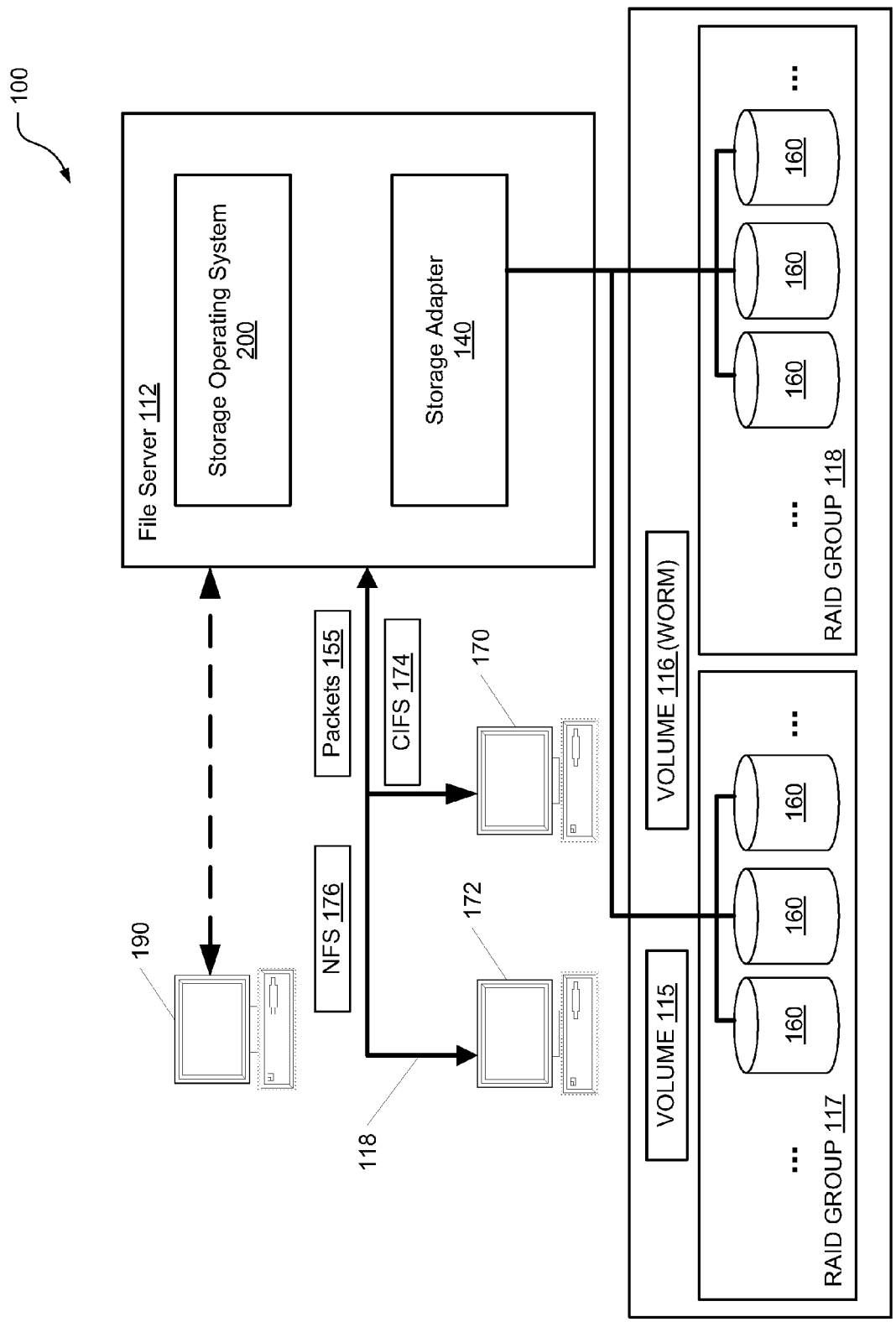
FIG. 1 is a schematic block diagram of a storage system environment, in accordance with an embodiment of the present invention.

FIG. 1 is a schematic block diagram of a storage system environment 100, in accordance with an embodiment of the present invention. The storage system environment 100 includes a file server 112 that is in communication with clients 170 and 172, administrator console 190, and storage devices 160. The file server 112 generally manages data stored on the storage devices 160 and it is linked to a network 118 that can include a local or wide area network, such as the Internet. Examples of storage devices 160 include hard disk drives, non-volatile memories (e.g., flash memories), and tape drives. The file server 112 generally includes a storage adapter 140 and a storage operating system 200 that implements a file system to logically organize data as a hierarchical structure of directories and files.

It should be appreciated that the techniques described herein may apply to any suitable type of special-purpose processing system (e.g., file serving appliance or file server 112) or general-purpose processing system, including a standalone computer. To that end, the file server 112 can be broadly, and alternatively, referred to as a "processing system." Moreover, embodiments of this present invention can be adapted to a variety of processing system architectures including, but not limited to, a network-attached storage environment, a storage area network, and disk assembly directly-attached to a client/host computer. The term "processing system" should, therefore, be taken broadly to include such arrangements.

Each client 170 or 172 may interact with the file server 112 in accordance with a client/server model of information delivery. That is, clients 170 and 172 may request the services of the file server 112, and the file server 112 may return the results of the services requested by clients 170 and 172 by exchanging packets 155 encapsulating, for example, Transmission Control Protocol (TCP)/Internet Protocol (IP) or another network protocol (e.g., Common Internet File System (CIFS) 174 and Network Files System (NFS) 176) format over the network 118.

The storage adapter 140 cooperates with the storage operating system 200 executing on the file server 112 to access data requested by the clients 170 and 172. The data may be stored on the storage devices 160 that are attached, via the storage adapter 140 to the file server 112 or other nodes of a network system. The storage adapter 140 includes input/output (I/O) interface circuitry that couples to the storage devices 160 over an I/O interconnect arrangement, such as a conventional high-performance, Fibre Channel serial link topology. The data is retrieved by the storage adapter 140 and formatted into packets 155 and transmitted to the clients 170 and 172, as also described in detail below.

An administrator console 190 is also provided in the storage system environment 100 for controlling various functions and operations of the file server 112. This administrator console 190 can be a client or a terminal connected via a dedicated port to the file server 112, or it can be networked via the network link 118, and reside at a remote location away from the file server 112.

In an illustrative embodiment, the storage devices 160 are grouped into Redundant Arrays of Independent Disks (RAID) groups 117 and 118. In one example, this organization is arranged so that some storage devices 160 store striped data and some storage devices 160 store separate parity for the data, in accordance with a RAID 4 configuration. However, other configurations (e.g. RAID 5 having distributed parity across stripes) are also contemplated. One or more volumes, such as volumes 115 and 116 may be setup to store data in one or more RAID groups 117 and 118. A "volume," as used herein, refers to a logical group of data containers, which refer to a file, logical unit number (LUN), or any other separately or individually addressable data structure. Each volume 115 or 116 has a file system associated therewith and accordingly, a "volume" may also refer to a "file system volume." Accordingly, it should be noted that the terms "volume" and "file system volume" may be used interchangeably. An example of a file system volume is a "traditional" volume where each storage device 160 and each RAID group 117 or 118 belong exclusively to a single volume. Another example of a file system volume is a "flexible" volume, which is a virtualized volume. Essentially, the flexible volume is a file system created within a file on an underlying file system. In the example depicted in FIG. 1, volume 115 depicted in FIG. 1 is a regular storage volume with full read and write access while volume 116 is a write once, read-many (WORM) volume in which selected data generally cannot be modified once they are stored. As used herein, "modification" of data includes changing (or altering) the data or deleting the data.

Figure 2:
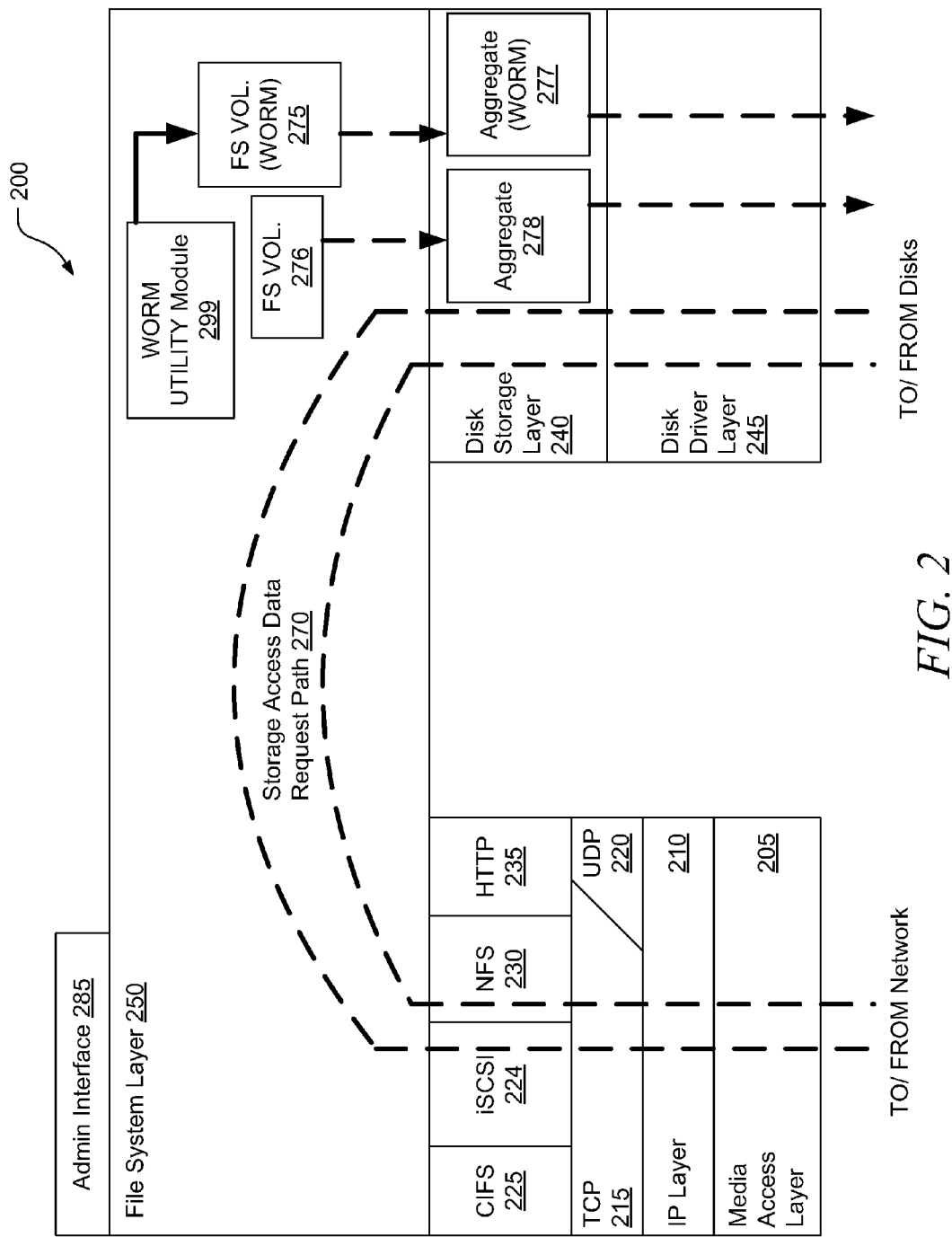
FIG. 2 depicts a block diagram of a storage operating system, in accordance with an embodiment of the present invention.

FIG. 2 depicts a block diagram of a storage operating system 200, in accordance with an embodiment of the present invention. In this example, the storage operating system 200 implements a write-anywhere file system that logically organizes data as a hierarchical structure of directories and files on storage devices. Each file may be implemented as a set of disk blocks configured to store data, whereas the directory may be implemented as a specially formatted file in which references to other files and directories are stored.

The organization of the storage operating system 200 is now described briefly. However, it should be noted that embodiments of this present invention can be implemented using a variety of alternate storage operating system architectures. As depicted in FIG. 2, the example of the storage operating system 200 comprises a series of software layers, including a media access layer 205 of network drivers (e.g., an Ethernet driver). The storage operating system 200 further includes network protocol layers, such as the Internet Protocol (IP) layer 210 and its supporting transport mechanisms, the Transport Control Protocol (TCP) layer 215, and the User Datagram Protocol (UDP) layer 220. A file system protocol layer provides multi-protocol data access and, to that end, includes support for the CIFS protocol 225, the iSCSI protocol 224, the NFS protocol 230, the Hypertext Transfer Protocol (HTTP) protocol 235, and other protocols (not shown) that may be open or proprietary in format. In addition, the storage operating system 200 includes a disk storage layer 240 that implements a disk storage protocol, such as a RAID protocol, and a disk driver layer 245 that implements a disk control protocol such as the small computer system interface (SCSI).

Bridging the disk software layers with the network and file system protocol layers is a file system layer 250 of the storage operating system 200. Generally, the file system layer 250 implements a file system having an on-disk format representation that is block-based using, for example, 4-kilobyte (KB) data blocks and using inodes or another data structure to describe the files. In response to transaction requests, the file system layer 250 generates operations to load (retrieve) the requested data from volumes 275-278 if it is not resident in memory. If the data is not in memory, the file system layer 250 indexes into the inode file using the inode number to access an appropriate entry and retrieve a volume block number. The file system layer 250 then passes the volume block number to the disk storage (RAID) layer 240, which maps that volume block number to a disk block number and sends the latter to an appropriate driver (e.g., an encapsulation of SCSI implemented on a Fibre Channel disk interconnection) of the disk driver layer 245. The disk driver layer 245 accesses the disk block number from volumes and loads the requested data in memory for processing by, for example, a file server. Upon completion of the request, the file server (and storage operating system 200) returns a reply (e.g., a conventional acknowledgement packet defined by the CIFS specification) to the client over a respective network connection.

It should be noted that the software "path" 270 through the various layers described above needed to perform data storage access for the client request received at the file server may alternatively be implemented in hardware or a combination of hardware and software. That is, in an alternate embodiment, the storage access request data path 270 may be implemented as logic circuitry embodied within a field programmable gate array (FPGA) or an application specific integrated circuit (ASIC).

Still referencing FIG. 2, overlying the file system layer 250 is a user interface 285 for the administrator. This can be accessed via the various protocols (CIFS, NFS, etc.) as described above. Additionally, the storage operating system 200 includes a WORM utility module 299 that resides generally in the file system layer 250. As will be described in detail below, this WORM utility module 299 is responsible for provisioning different types of WORM states to volumes (e.g., file system volumes 275 and 276) and/or aggregates 277 and 278, which are described in more detail below. These volumes 275 and 276 are carried respectively into the RAID layer as corresponding, differentiated WORM and non-WORM RAID aggregates 277 and 278, respectively. By action of the WORM utility module 299, the respective directory pathways (or other identifying logical organization) of any WORM data are, likewise generally prevented from being modified so long as WORM data resides in the path/tree.

It should be appreciated that in other embodiments, the storage operating system 200 may include fewer, more, or different modules apart from those shown in FIG. 2. For example, in an alternate embodiment, the WORM utility module 299 may also be included in or integrated within the disk storage layer 240 and/or the disk driver layer 245.

Figure 3:
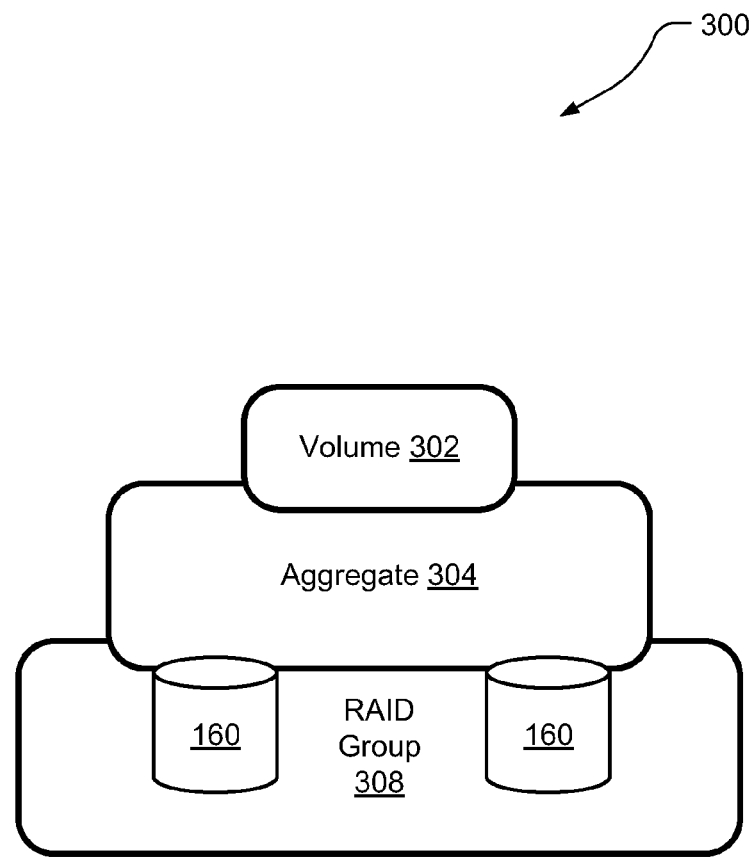
FIG. 3 depicts a block diagram depicting a system with different types of WORM states provisioned between volumes and aggregates, according to an embodiment of the present invention.

FIG. 3 depicts a block diagram depicting a system 300 with different types of WORM states provisioned between volumes and aggregates, according to an embodiment of the present invention. As depicted, the system 300 includes a RAID group 308, an aggregate 304, and a volume 302. The volume 302 comprises a cluster of physical storage devices 160, defining an overall logical arrangement of disk space. The storage devices 160 within a volume can be organized as one or more groups of RAID, such as RAID group 308. The aggregate 304 is illustratively layered on top of the RAID group 308. An "aggregate," as used herein, is the underlying physical "volume" comprising one or more groups of storage devices 160, such as RAID group 308. That is, the aggregate 304 comprises one or more RAID groups, such as the RAID group 308. The aggregate 304 has its own physical volume block number space and maintains metadata, such as block allocation structures, within that physical volume block number space.

In this example, different types of WORM states may be provisioned between the volume 302 and the aggregate 304. That is, the type of WORM state applied to the volume 302 may be different from the type of WORM state applied to the aggregate 304. As used herein, a "WORM state" refers to an implementation of a particular data retention policy for WORM data by, for example, the file system layer and/or other modules associated with a processing system. There is a variety of different types of data retention policies and therefore, different types of WORM states that implement the different policies. A type of WORM state called "Compliance" WORM state refers to an implementation of the Securities and Exchange Commission (SEC) Rule 240.17a-4 data retention policy, which includes rules for the preservation of records by exchange members, brokers, and dealers. Such Compliance WORM state provides an untrusted storage administrator model of operation in which WORM data is protected, once committed to a storage device, even from an administrator account. Another type of WORM state called "Enterprise" WORM state refers to a more flexible or less strict data retention policy, when compared with SEC Rule 240.17a-4, that permits some actions by an administrator account while still enforcing WORM protection for file protocols like CIFS and NFS. An "administrator account" is a user account that allows a user with access to this administrator account to make changes that will affect other users. Through use of an administrator account, a user (or administrator) can, for example, change security settings, install software and hardware, make changes to other user accounts, destroy volumes and aggregates, and access all files on a processing system.

Unlike previous approaches, the type of WORM state of the volume 302 is not inherited from the type of WORM state of the aggregate 304. That is, the WORM state applied to the volume 302 is not copied from the WORM state applied to the aggregate 304. The WORM state applied to the volume 302 is therefore decoupled from the WORM state applied to the aggregate 304. As a result, the type of WORM state applied to the volume 302 is independent of the aggregate 304. By allowing the type of WORM state of the volume 302 to be different from the aggregate 304, additional aggregates do not need to be created or provisioned when different types of WORM states are required. By having an "aggregate" WORM state that is independent of the "volume" WORM state, WORM related decisions and actions related to an aggregate (e.g., aggregate destroy, disk zero, etc.) can be made based on the "aggregate" WORM state if, for example, the volumes are offline. The provisioning of "volume" WORM states independent of the "aggregate" WORM states may also, for example, result in the efficient utilization of storage devices because less storage devices are needed to create a smaller number of aggregates.

Figure 4:
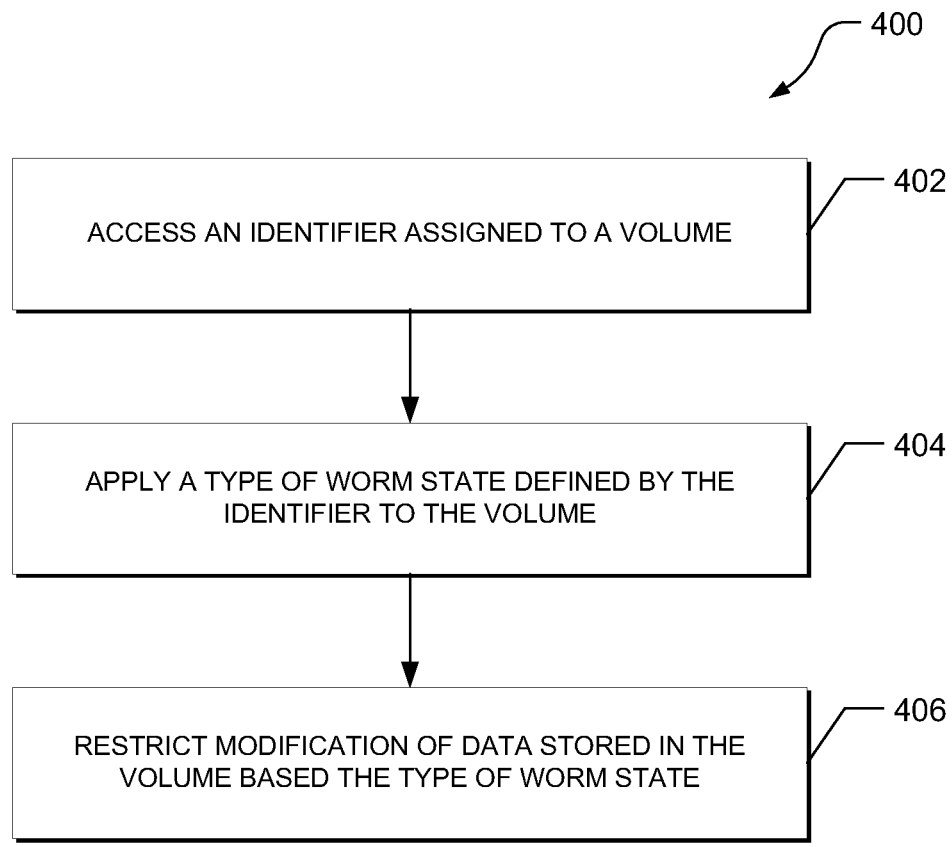
FIG. 4 depicts a flow diagram of a general overview of a method, in accordance with an embodiment, for provisioning one or more types of WORM states.

FIG. 4 depicts a flow diagram of a general overview of a method 400, in accordance with an embodiment, for provisioning one or more types of WORM states. In an example, the method 400 may be implemented by the WORM utility module 299 depicted in FIG. 2 and employed in the file server 112 of FIG. 1. As depicted in FIG. 4, an identifier assigned to a volume (or "volume" identifier) is accessed at 402. This identifier is a value (e.g., numeric and/or textual) that uniquely identifies a type of WORM state. One identifier, for example, may be a flag value with a few bits. In an example where three different types of WORM states may be provisioned, an identifier may be a two-bit value that uniquely identifies one of three different types of WORM states.

This volume identifier may be stored in a file that is located outside the volume, and in accessing this identifier, the volume identifier can be read from this file. It should be noted that each aggregate may have a directory assigned to each volume. This directory includes various meta-information files (e.g., volume grade level file), each of which stores various meta-information regarding the aggregate and/or volume. In one embodiment, the volume identifier can be stored in one of these meta-information files.

In embodiments of the present invention, the type of WORM state assigned to a volume, as identified by its volume identifier, may be different from the type of WORM state assigned to the aggregate. As explained in more detail below, another identifier identifying a different type of WORM state may be assigned to the aggregate. After the volume identifier is accessed, the type of WORM state defined by the volume identifier is applied to the volume at 404, which may result in different types of WORM states between the aggregate and the volume. The type of WORM state may be applied by, for example, triggering or causing a WORM utility module to load, switch to, or execute instructions that implement the particular data retention policy associated with the type of WORM state.

As depicted at 406, with the type of WORM state applied to the volume, the modification of any WORM data stored in the volume is restricted based on the type of WORM state applied. As discussed above, modification of data includes either the deletion or changing of data. For example, if the applied type of WORM state allows data to be modified, then the modification of data stored in the volume is not restricted from being modified. However, if the applied type of WORM state prohibits data from being modified, then the data stored in the volume is restricted from being modified. Particularly, the decision to restrict modification may be based on the WORM state of a file, the WORM state of a volume, and/or the WORM state of an aggregate. For example, if an attempt is made to modify an aggregate, the WORM state of the aggregate may be checked before the modification. If an attempt is made to modify a volume, the WORM state of the volume may be checked. If an attempt is made to modify data of a file, the WORM states of both the file and the volume may be checked before the modification.

Figure 5:
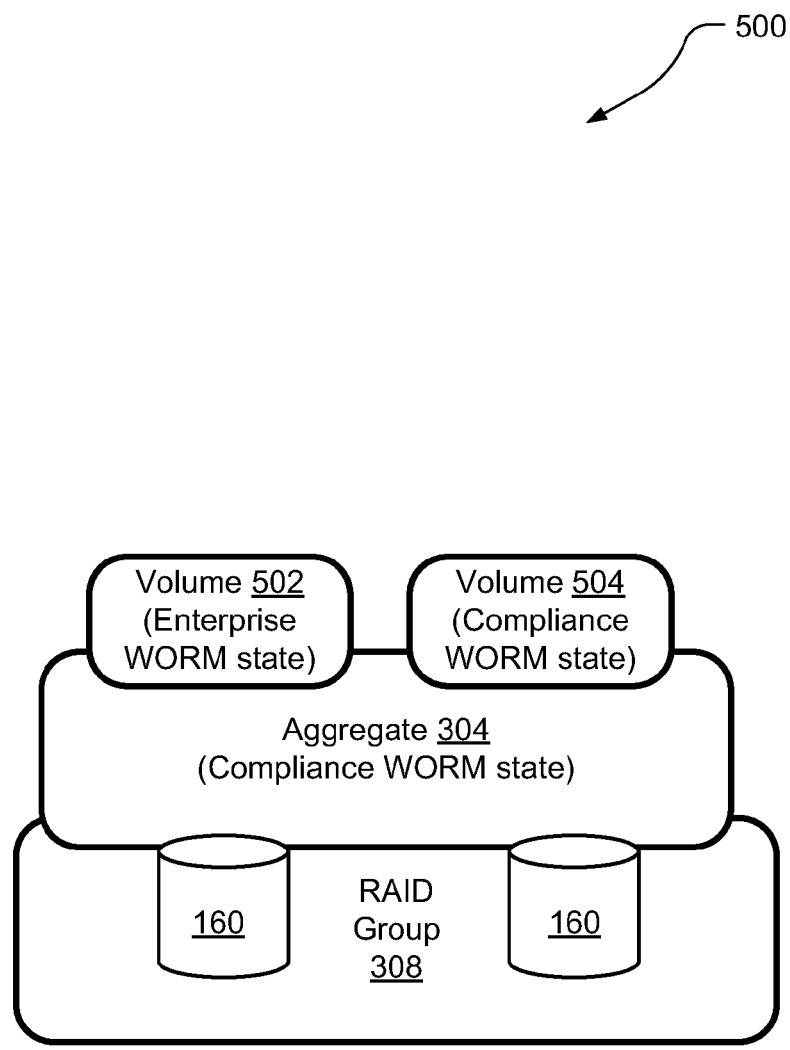
FIG. 5 depicts a block diagram depicting another example of a system, in accordance with an alternate embodiment, with different types of WORM states provisioned between multiple volumes.

FIG. 5 depicts a block diagram depicting another example of a system 500, in accordance with an alternate embodiment, with different types of WORM states provisioned between multiple volumes. As depicted, the system 500 includes a RAID group 308, an aggregate 304, and two volumes 502 and 504. In this embodiment, different types of WORM states may be applied to volumes 502 and 504. For example, the type of WORM state applied to volume 502 is the Enterprise WORM state, which is discussed above. In contrast, the type of WORM state applied to volume 504 is the Compliance WORM state, which is also discussed above.

Furthermore, different types of WORM states may be provisioned between the volumes 502 and 504 and the aggregate 304. For example, the type of WORM state applied to volume 502 is the Enterprise WORM state. However, the type of WORM state applied to aggregate 304 is the Compliance WORM state. In an embodiment, as will be explained in more detail below, types of WORM states applied to the volumes 502 and 504 are not more strict than the type of WORM state applied to the aggregate 304.

Figure 6:
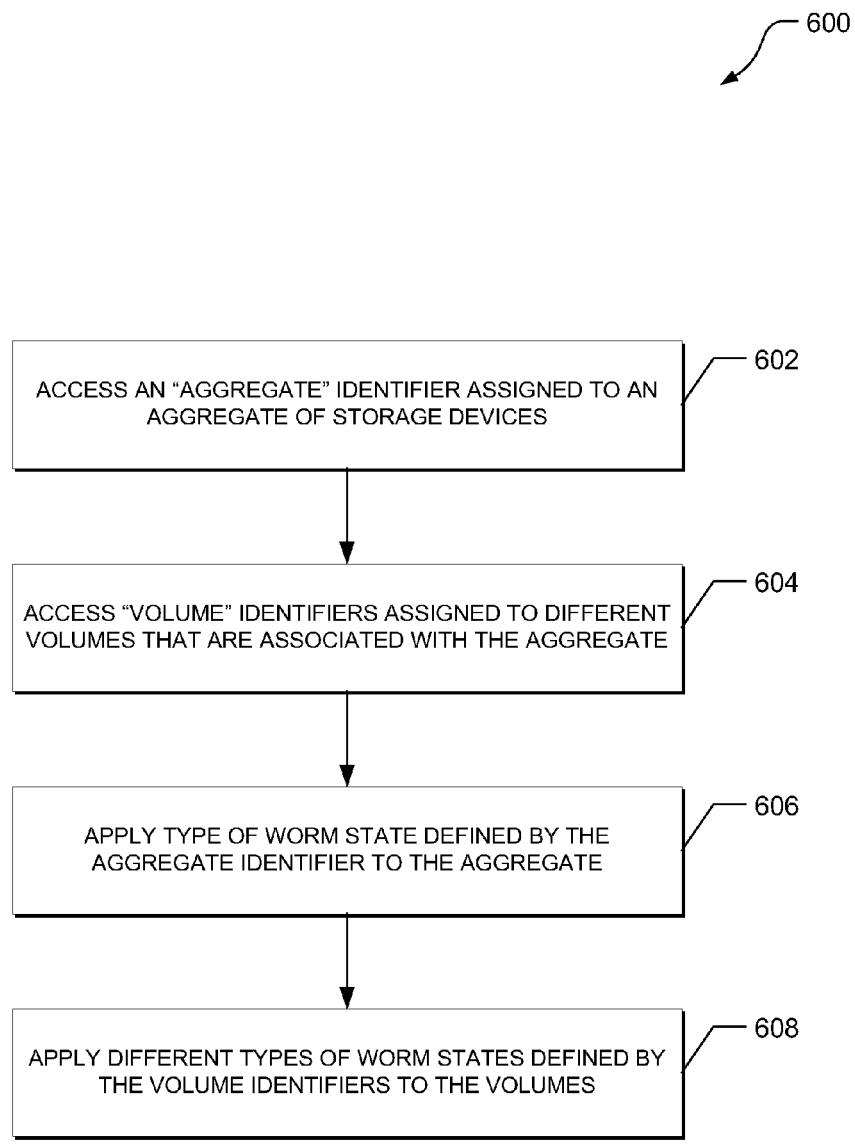
FIG. 6 depicts a flow diagram of a more detailed method, in accordance with another embodiment, for provisioning different types of WORM states.

FIG. 6 depicts a flow diagram of a more detailed method 600, in accordance with another embodiment, for provisioning different types of WORM states. In an example, the method 600 may be implemented by the WORM utility module 299 depicted in FIG. 2 and employed in the file server 112 of FIG. 1. As depicted in FIG. 6, an identifier assigned to an aggregate of storage devices (or "aggregate" identifier) is accessed at 602. Furthermore, multiple identifiers assigned to different volumes associated with the aggregate (or "volume" identifiers) are accessed at 604. In this example, each volume identifier may identify different types of WORM states between the volumes.

After the identifiers are accessed, the type of WORM state identified by the aggregate identifier is applied to the aggregate at 606. Additionally, the different types of WORM states defined by the volume identifiers are applied to their respective volumes at 608. Thus, the aggregate and volumes may be provisioned with different types of WORM states. In addition, the volumes between themselves may also be provisioned with different types of WORM states.

With the use of identifiers, the type of WORM state of either the aggregate or the volume can be changed by changing either the volume identifier or the aggregate identifier to a different identifier. For example, a request may be received to change the existing volume or aggregate identifier to a different volume or aggregate identifier that identifies a different type of WORM state. Upon receipt of the request, the different type of WORM state is applied to the volume or aggregate. These changes can be made without, for example, the need to copy or move the data to a different volume or aggregate with a different WORM state.

It should be appreciated that there may be restrictions as to the type of WORM state that can be applied. In one embodiment, the type of WORM state applied to a volume cannot be more strict than the type of WORM state applied to an aggregate. As an example, a data retention policy that does not allow data to be modified under any circumstance is more strict than another data retention policy that allows data to be modified under certain circumstances. In another example, a type of WORM state may be more "strict" that another type of WORM state when, for example, it has more modification restrictions. Therefore, a "first" type of WORM state is not more strict than a "second" type of WORM state when, for example, the first type does not have more modification restrictions than the second type. It should be noted that in one example, a user (e.g., an administrator) may define the strictness of one WORM state relative to another WORM state. For example, the user may assign a ranking, for use by the WORM utility module, to each WORM state, and this ranking defines the strictness of each WORM state relative to other WORM states.

In an illustrative example, referring back to FIG. 5, the type of WORM state applied to the aggregate 304 is Compliance WORM state, which is more strict than the Enterprise WORM state. The Compliance WORM state is more strict than Enterprise WORM state because the data retention policy under SEC Rule 240.17a-4 has more modification restrictions. For example, the Compliance WORM state prohibits deletion of data by an administrator account while the Enterprise WORM state allows deletion of data by the same administrator account. Other examples of data modification restrictions associated with the Compliance WORM state that are not included in an Enterprise WORM state are listed in the following Table A:

TABLE A

Volume destroy disallowed if volume contains unexpired data
Volume rename disallowed
Volume copy disallowed if destination has unexpired data
Resynchronization disallowed
"Aggregate destroy" disallowed if aggregate contains volumes
Disk zeroing disallowed
RAID label editing disallowed
Synchronous mirroring disallowed
"Aggregate restore" disallowed Given that the types of volume WORM states are not more strict than the aggregate WORM state, the Enterprise WORM state may be applied to volume 502. As such, in one example, an administrator account may not modify data that is stored in the aggregate 304 (and also not in the volume 502). However, data stored in the volume 502 may be modified by an administrator account. Additionally, the Compliance WORM state may be applied to volume 504 because this Compliance WORM state is not more strict than the same Compliance WORM state applied to the aggregate 304. Here, an administrator account may be prohibited from deleting data stored in the volume 504.

In another example and still referring to FIG. 5, if the Enterprise WORM state is instead applied to the aggregate 304, then the Compliance WORM state may not be applied to the volumes 502 and 504 because the Compliance WORM state is more strict than the Enterprise WORM state. Instead, the volumes 502 and 504 are restricted to the Enterprise WORM state and a non-WORM state, which does not have any data retention policy. The following Table B illustrates the various examples of combinations of types of WORM states that may be applied to a particular aggregate:

TABLE B

|  |  | Change to: | | |
|---|---|---|---|---|
|  |  | Non-WORM | Enterprise WORM state | Compliance WORM state |
| Change from: | Non-WORM | N/A | Allowed | Allowed |
|  | Enterprise WORM state | Not Allowed | N/A | Allowed |
|  | Compliance WORM state | Not Allowed | Not Allowed | N/A |

Figure 7:
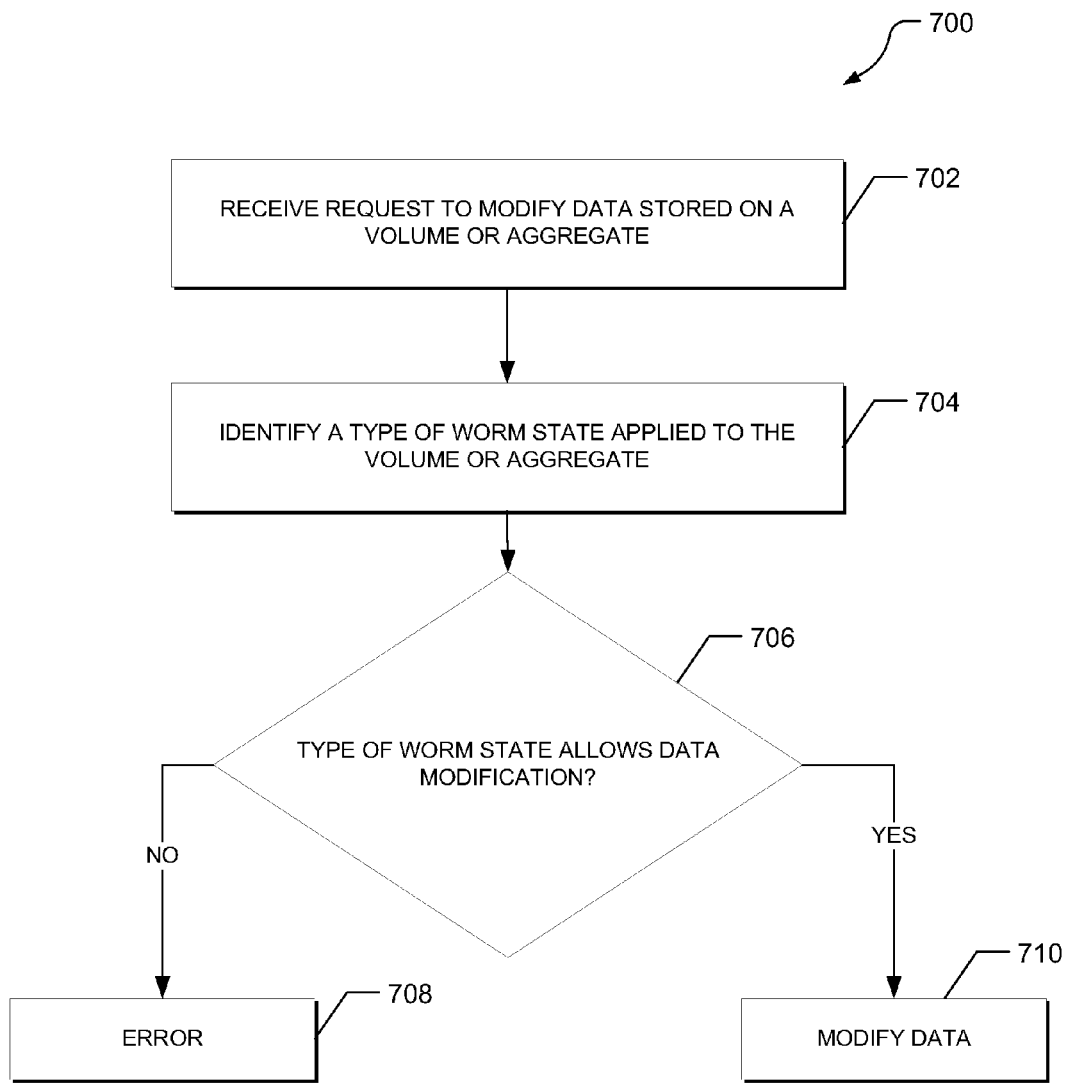
FIG. 7 depicts a flow diagram of a general overview of a method, according to an embodiment of the present invention, for processing data modification requests.

FIG. 7 depicts a flow diagram of a general overview of a method, according to an embodiment of the present invention, for processing data modification. In one example, the method 700 may be implemented by the WORM utility module 299 depicted in FIG. 2 and employed in the file server 112 of FIG. 1. As depicted in FIG. 7, a request to modify data stored on a volume or aggregate is received at 702. The request may be a request to change data or request to delete the data. Based on the previously accessed identifier, a type of WORM state applied to the volume or aggregate is identified at 704. Thereafter, a check is conducted at 706 to identify whether the type of WORM state allows data stored in the volume or aggregate to be modified. If the type of WORM state does not allow data modification, then an error is generated at 708. However, if the type of WORM state does allow data modification, then the data stored in the volume or aggregate is modified based on the request.

Figure 8:
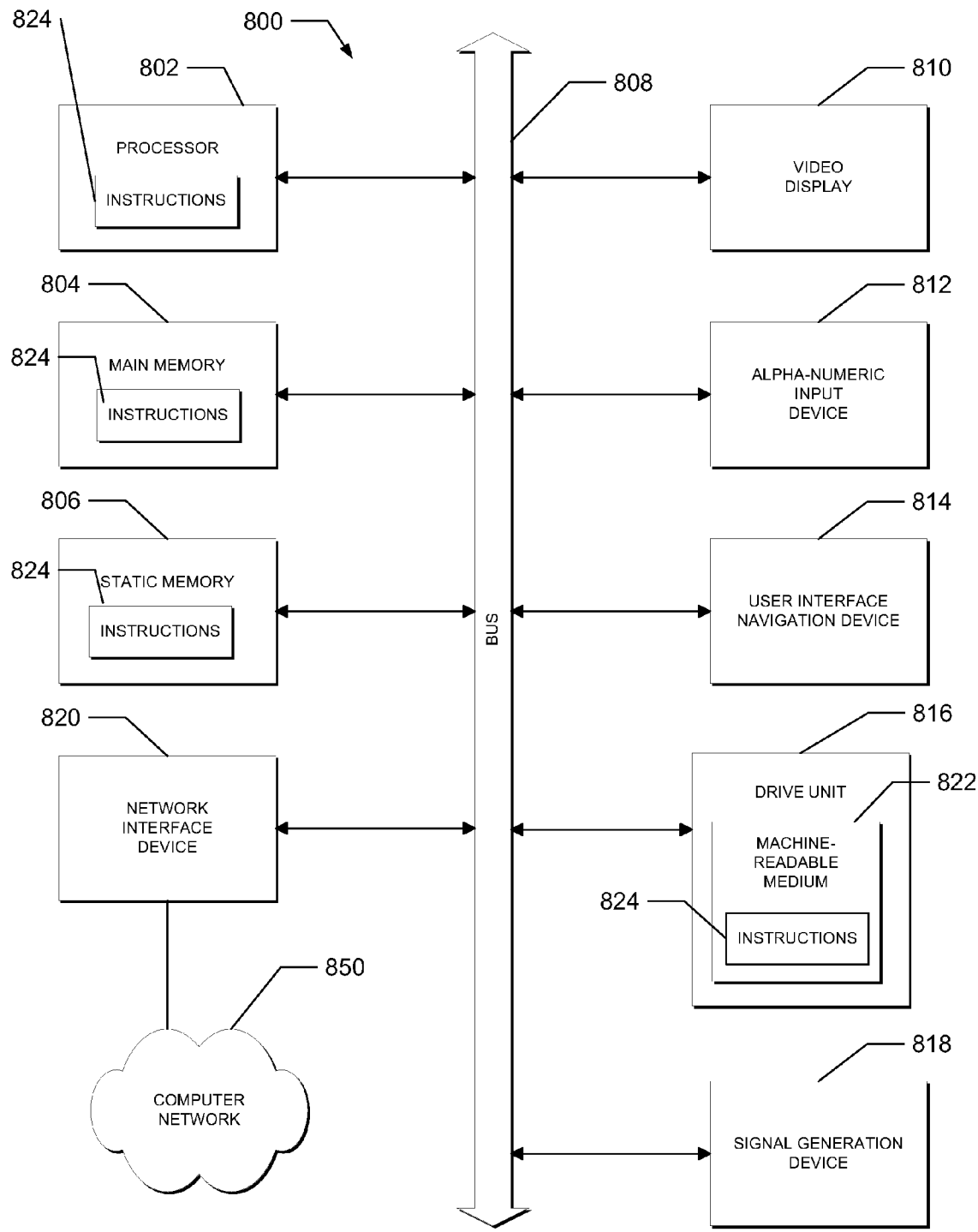
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The processing system 800 may further include video display unit 810 (e.g., a plasma display, a liquid crystal display (LCD) or a cathode ray tube (CRT)). The processing system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for provisioning different types of WORM data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of provisioning a write once, read many (WORM) state, the method comprising:
   accessing an identifier assigned to a volume, the volume being associated with an aggregate of storage devices, the identifier identifying a first type of WORM state that is different from a second type of WORM state associated with the aggregate;
   applying the first type of WORM state identified by the identifier to the volume, the application of the first type of WORM state resulting in the volume and the aggregate of storage devices having different types of WORM states, each of the different types of WORM states referring to a different data retention policy; and
   restricting modification of data stored in the volume based on the first type of WORM state.

2. The method of claim 1, further comprising:
   accessing an additional identifier assigned to a different volume that is associated with the aggregate, the additional identifier identifying a third type of WORM state that is different from the first type; and
   applying the third type of WORM state to the different volume, the application of the first and third types resulting in different types of WORM states between the volume and the different volume.

3. The method of claim 1, wherein the second type of WORM state includes more modification restrictions than the first type of WORM state.

4. The method of claim 1, wherein the first type of WORM state is not inherited from the second type of WORM state.

5. The method of claim 1, wherein the identifier is stored in a file that is located outside of the volume, wherein the accessing of the identifier comprises reading the identifier from the file.

6. The method of claim 1, further comprising:
   receiving a request to change the identifier to a different identifier that identifies a different type of WORM state; and
   applying the different type of WORM state to the volume.

7. A processing system, comprising:
   at least one processor; and
   a machine-readable medium in communication with the at least one processor, the machine readable medium storing a write once, read many (WORM) utility module that is executed by the at least one processor to cause operations to be performed, the operations comprising:
      accessing a first identifier assigned to an aggregate of storage devices, the first identifier identifying a first type of WORM state;
      accessing a second identifier assigned to a volume, the volume being associated with the aggregate, the second identifier identifying a second type of WORM state that is different from the first type;
      applying the first type of WORM state identified by the first identifier to the aggregate; and
      applying the second type of WORM state identified by the second identifier to the volume, the application of the first and second types resulting in the volume and the aggregate of storage devices having different types of WORM states, each of the different types of WORM states referring to a different data retention policy.

8. The processing system of claim 7, wherein the operations further comprise:
   receiving a request to modify data stored in the volume; and
   restricting modification of the data based on the second type of WORM state.

9. The processing system of claim 7, wherein the operations further comprise:
   receiving a request to modify data stored outside the volume; and
   restricting modification of the data based on the first type of WORM state.

10. The processing system of claim 9, wherein the request to modify data includes a request to delete the data or a request to change the data.

11. The processing system of claim 7, wherein the WORM utility module is included in a file system.

12. A processing system, comprising:
   at least one processor; and
   a machine-readable medium in communication with the at least one processor, the machine readable medium storing a write once, read many (WORM) utility module that is executed by the at least one processor to cause operations to be performed, the operations comprising:
      accessing an identifier assigned to a volume, the volume being associated with an aggregate of storage devices, the identifier a first type of WORM state that is different from a second type of WORM state associated with the aggregate;
      applying the first type of WORM state identified by the identifier to the volume, the application of the first type of WORM state resulting in the volume and the aggregate of storage devices having different types of WORM states, each of the different types of WORM states referring to a different data retention policy; and
      restricting modification of data stored in the volume based on the first type of WORM state.

13. The processing system of claim 12, wherein the operations further comprise:
   accessing an additional identifier assigned to a different volume that is associated with the aggregate, the additional identifier identifying a third type of WORM state that is different from the first type; and
   applying the third type of WORM state to the different volume, the application of the first and third types resulting in different types of WORM states between the volume and the different volume.

14. The processing system of claim 12, wherein the first type of WORM state is not more strict than the second type of WORM state.

15. The processing system of claim 14, wherein the first type of WORM state does not have more modification restrictions than the second type of WORM state.

16. The processing system of claim 14, wherein the first type of WORM state allows deletion of the data by an administrator account, and wherein the second type of WORM state prohibits deletion of the data by the administrator account.

17. The processing system of claim 12, wherein the operations further comprise:
   receiving a request to change the identifier to a different identifier that identifies a different type of WORM state; and
   applying the different type of WORM state to the volume.

18. The processing system of claim 12, wherein the identifier is stored in a file that is located outside of the volume, wherein the operation of accessing the identifier comprises reading the identifier from the file.

19. The processing system of claim 12, wherein the first type of WORM state is not inherited from the second type of WORM state.

20. The processing system of claim 12, wherein the operations further comprise:
   receiving a request to modify the data stored in the volume.

* * * * *